Aug. 24, 1926.

E. T. FERNGREN 1,597,440

CONTINUOUS TANK FURNACE

Filed March 2, 1923   3 Sheets-Sheet 2

INVENTOR
Enoch T. Ferngren.
BY C. A. Rowley
ATTORNEY

Aug. 24, 1926.

E. T. FERNGREN 1,597,440

CONTINUOUS TANK FURNACE

Filed March 2, 1923  3 Sheets-Sheet 3

INVENTOR
Enoch T. Ferngren
BY C. A. Rowley
ATTORNEY

Patented Aug. 24, 1926.

1,597,440

UNITED STATES PATENT OFFICE.

ENOCH T. FERNGREN, OF TOLEDO, OHIO, ASSIGNOR TO THE LIBBEY-OWENS SHEET GLASS COMPANY, OF TOLEDO, OHIO, A CORPORATION OF OHIO.

CONTINUOUS TANK FURNACE.

Application filed March 2, 1923. Serial No. 622,270.

This invention relates to a continuous tank furnace, and more particularly to such a furnace designed to supply molten glass to a sheet-glass drawing machine. While the furnace was primarily designed for use with a sheet drawing apparatus of the type set forth in the patent to Colburn, 1,248,809, granted Dec. 4, 1917, it will be equally useful with other types of sheet drawing machines where the sheet is drawn vertically form a pool of molten glass.

The furnaces now in general use with this type of machine comprise tanks of a generally rectangular shape which contain a large reservoir of molten glass. This molten glass flows slowly through the tank from a melting chamber at one end to the draw-pot at the other end from which the glass sheet is drawn upwardly. A considerable portion of the molten glass will lie practically undisturbed or stagnant in the "dead" corners of the tank, and this glass gradually changes in temperature and composition until it becomes quite different from the main current of molten glass flowing toward and into the drawpot. This stagnant glass leads to the formation of devitrified glass, or so-called "dog-metal", in the draw-pot and even in the sides of the channel leading into the draw-pot where the movement of the glass is sluggish as compared to the movement in the channel. These variations in the composition of the molten glass, together with the resulting differences in the tractive response of the glass as it is drawn along toward and into the sheet, cause inequalities and blemishes in the finished product.

The present invention aims to avoid these difficulties by providing a tapering tank construction that is practically devoid of all dead spaces or corners, and wherein all of the molten glass will flow unifromly and evenly toward the sheet source. Practically none of the glass will remain in the tank for as long a period as in the dead corners of the rectangular furnace constructions, and there will be much less reason or opportunity for the formation of devitrified glass.

It is also an object of the invention to cause the glass which supplies the sheet source to advance from the furnace to the point of draw at a greater velocity along the sides of the flow than toward the center, whereby the glass flowing into the sheet from the rear or closed end of the draw-pot will be renewed from this excess flow of glass at the sides of the pot.

In connection with the tapering or progressively narrowing channel through which the glass flows from the melting tank to the draw-pot, a peculiarly wedge-shaped float is employed at an intermediate point in the channel to assist in regulating the flow of the upper strata of the glass and enforce a faster and more regular flow along the sides of the tapered channel. As a further aid to this same end, an elevated ridge or throttling member is built into the bottom of the channel adjacent the draw-pot, its principal function being to divert a greater quantity of the glass toward the side edges of the draw-pot.

This tapered furnace construction also lends itself to a gradual reduction in the height and general dimensions of the heating chamber above the glass as the flow proceeds from the melting tank to the sheet source. This makes possible a gradual reduction in the temperature of the furnace atmosphere above the glass, and the temperature of the glass will be progressively reduced as it moves toward the draw-pot. This loss of heat from the glass will be gradual and will impart a more uniform fluidity, and more homogeneous structure, to the flowing stream of plastic glass in the narrower and shallower portions of the tapering channel, and will tend to prevent carrying along with the advancing glass any highly heated vein from the melting end of the furnace. The invention also comprises, in addition to the progressively reduced cover arches, a system of independently adjustable partitions or radiating shields for impeding the flow of heated gases from the melting and refining tanks to that portion of the tapered channel which serves as a cooling chamber.

The above and other objects and advantages of this invention will be more clearly understood from the following detailed description of one approved form of furnace embodying the principles of this invention.

In the accompanying drawings:

Fig. 4 is a transverse vertical section through the draw-pot and the heating furnace therebeneath, this view being taken substantially on the line 4—4 of Fig. 2.

Figure 1:
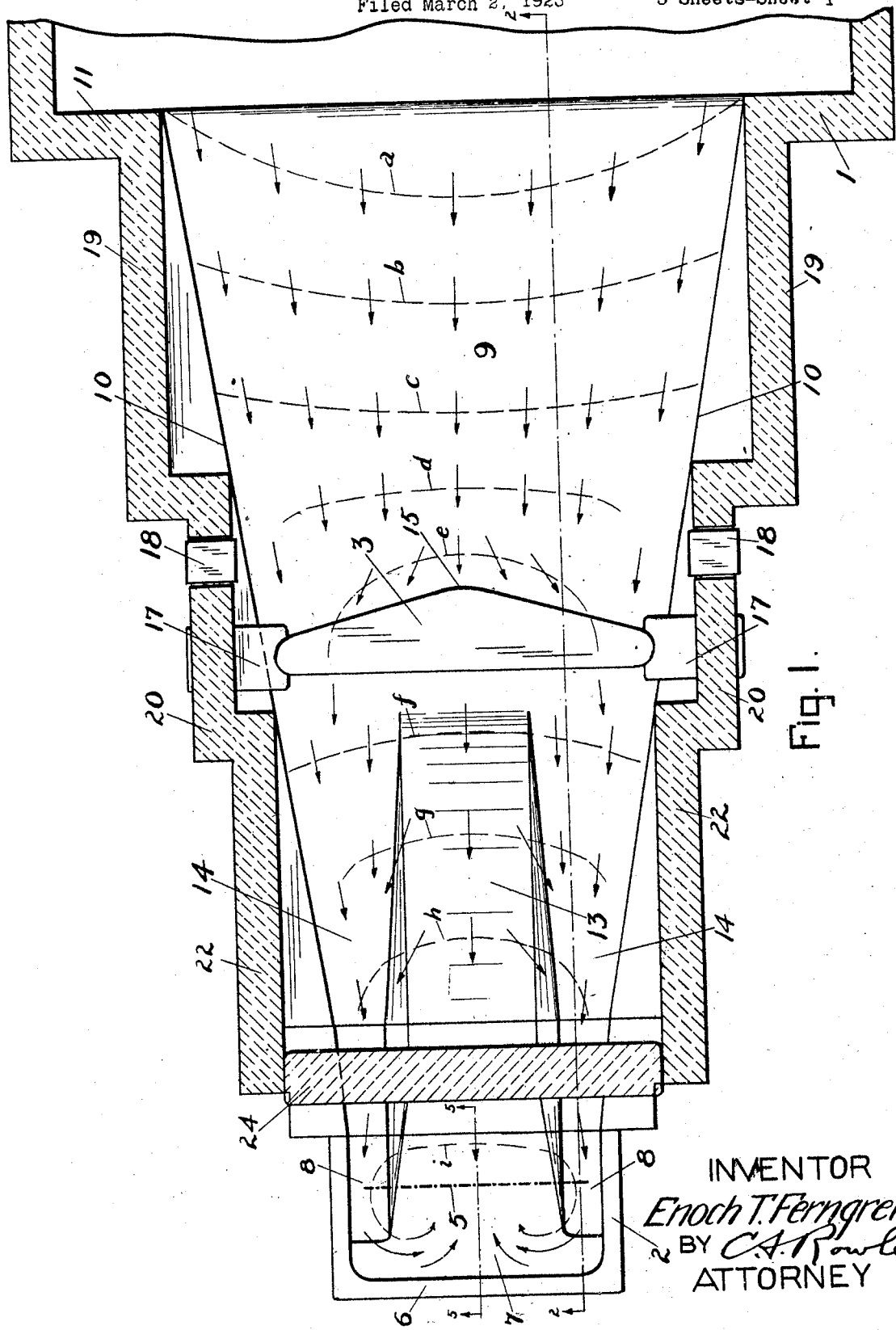
Fig. 1 is a horizontal section through the enclosing chambers, showing a plan view of the general tank construction. This section is taken substantially on the line 1—1 of Fig. 2.

The melting tank 1 is of the usual rectangular construction and the larger portion thereof is broken away in the drawings, only the rear end being illustrated, from which the glass flows through the refining and cooling chambers to the shallow draw-pot 2 from which the glass sheet is drawn upwardly. The molten glass is not indicated in the drawings, as its presence would cover up several of the important features of the furnace construction. However, the floater 3, and other features to be described hereinafter, are shown in operative position as if the glass were present in the tank. The normal glass level is indicated by the broken line 4 in Figs. 2 and 3 of the drawings. Also the position occupied by the glass sheet, when same is being drawn upwardly from the pot 2, is indicated by the broken line 5 in Figs. 1 and 2 of the drawings.

The draw-pot 2 is of much the same general dimensions as has been customary in previous constructions, being somewhat wider than the width of the sheet to be drawn therefrom and relatively shallow so as to contain only a small quantity of molten or plastic glass as compared with the main portions of the furnace construction. The glass in this draw-pot is maintained at the requisite temperature by a furnace construction therebeneath as will be later described. One end of this draw-pot is open and in direct communication with the delivery end of the furnace. The other end 6 of the draw-pot is closed and contains a body of molten glass 7 which feeds the adjacent side of the glass sheet 5. As this body of glass 7 is drawn into the sheet, it must be replaced by molten glass from the furnace, and in previous construction this glass has to flow beneath the sheet source to the closed end 6 of the pot. One object of the present invention is to provide deeper side channels 8 in the draw-pot and direct the greater portion of the molten glass flowing to the closed end of the pot through these channels. This will be described more in detail hereinafter.

Figure 2:
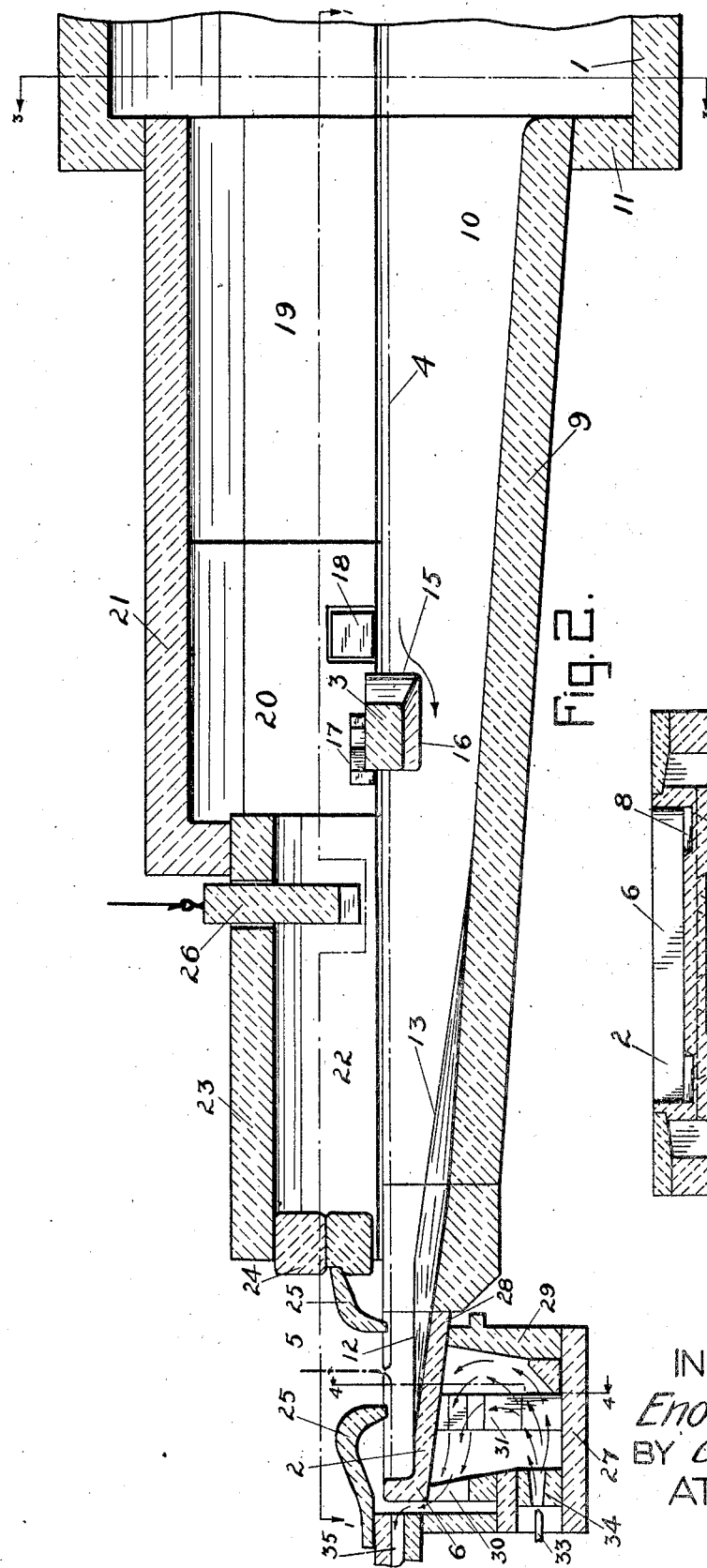
Fig. 2 is a longitudinal vertical section taken substantially on the line 2—2 of Fig. 1.
Figure 3:
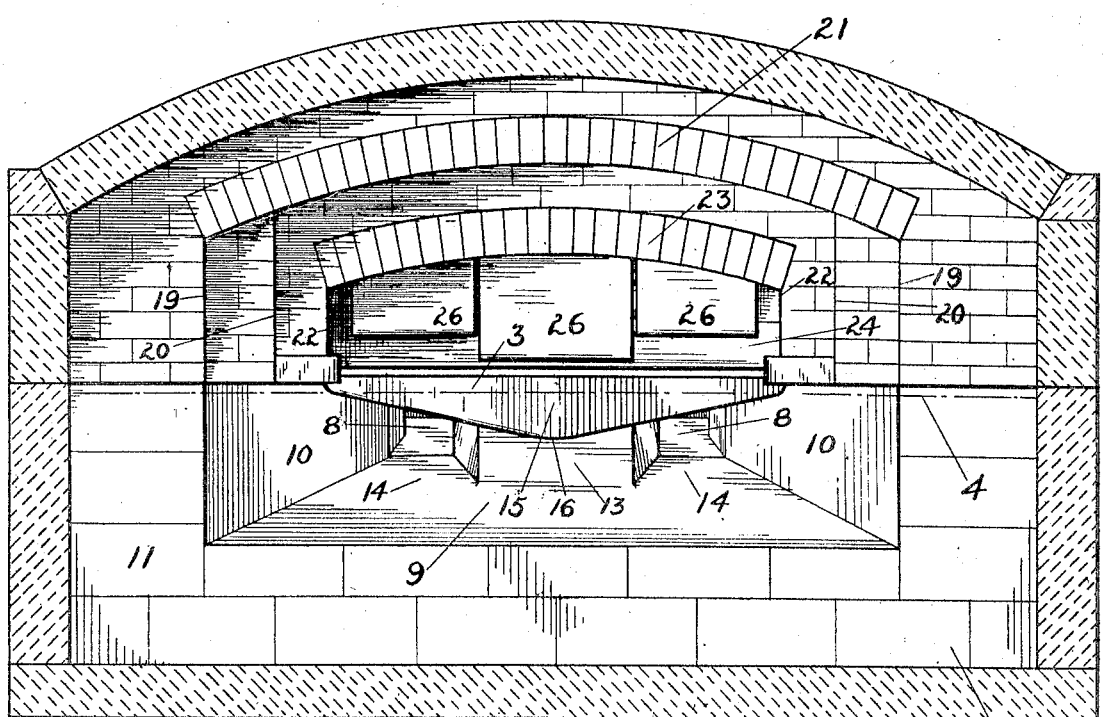
Fig. 3 is a transverse vertical section taken substantially on the line 3—3 of Fig. 2.

That portion of the furnace structure through which the molten glass flows from the melting tank 1 to the draw-pot 2, wherein the refining and cooling operations are carried out, is of a gradually tapering formation both in width and depth. It comprises an upwardly sloping floor or bottom wall 9 and inwardly sloping or converging side walls 10. The entrance to this tapering channel is preferably somewhat narrower and shallower than the melting pot itself, as indicated in Figs. 1, 2 and 3, but of considerably greater dimensions than the width and depth of the draw-pot 2. The side walls 10 gradually converge from their junction with the rear wall 11 of the melting tank until they join evenly with the side walls of the narrower draw-pot 2. The floor 9 slopes up from its junction with the wall 11 of the melting chamber until it coincides with the bottoms of the channels 8 leading into the draw-pot. The central floor 12 of the draw-pot extends horizontally a short distance into the narrower end of the tapered channel and then slopes down at a steeper angle as indicated at 13 until this slope merges with the floor 9. Thus a central ridge or wedge is formed in the narrower portion of the channel which acts as a throttling or retarding member for the glass flowing through the central portion, and tends to divert a portion of this glass towards the deeper edge portions 14 of this channel. This unimpeded glass will flow ahead at a greater rate than the central portions of the stream, into and through the channels 8 to the rear end 7 of the draw-pot.

At an intermediate location in this tapered refining and cooling chamber, the peculiarly shaped float 3 is positioned. The front face of this float is wedge-shaped with the edge 15 of the wedge pointed upstream as indicated in Figs. 1 to 3. The float is also wedge-shaped as to its bottom portion with the greatest thickness at the center, as indicated at 16 in Figs. 2 and 3. The ends of the wedge are engaged and held in position by the blocks 17 slidable through the sides of the furnace chamber, as indicated in Fig. 1.

The manner in which the surface strata of the molten glass will advance through this refining and cooling channel is graphically illustrated by the broken lines with arrows thereon in Fig. 1 of the drawings. As the flowing glass enters the channel, the side portions of the stream will be retarded by the converging sides of the channel as well as by the friction offered by the side walls 10, so that the central portions will tend to advance as indicated by the broken line a. This effect would continue and become more pronounced as the glass advances down the channel were it not for the retarding influence of the wedge-shaped float 3. The thicker central portions of this float will retard the glass flowing along the middle of the channel and force this central glass to either flow under this deep central portion or flow toward the sides of the channel where there is a freer passage beneath the shallower ends of the float. The resulting effect on the advancing stream of glass is indicated by the broken lines $b$, $c$, $d$ and $e$, which show that the side streams of glass gradually overcome their initial handicap and flow ahead through the less obstructed side portions of the channel. After the glass has passed beyond the float 3, the central flow is further impeded by the throttling ridge 13 already described so that more of the molten glass will be diverted toward the side portions 14 of the channel, as indicated by the broken lines $f$, $g$ and $h$. When this surface glass reaches the draw-pot 2, the central portion of the flow will advance rather uniformly toward the sheet, as indicated by the broken line $i$, but the deeper edge portions of the stream in the channels 8 will flow under and around the ends of the sheet source to supply the body of glass 7 in the closed end of the pot. This glass 7 will then be drawn back into the side of the sheet remote from the furnace, as indicated by the arrows at the left-hand end of Fig. 1. In this way, a substantially even and uniform flow of molten glass is provided to both sides of the sheet source and no pockets or dead corners are left in the refining or cooling portions of the furnace structure where stagnant glass may accumulate and devitrify. Obviously, as the cross-sectional area of the flowing stream of glass decreases, the speed of the stream must increase. This constantly increasing flowing speed as the draw-pot is approached also prevents stagnation and its attendant evils.

Also, the upwardly sloping bottom wall 9 produces a constant upward movement of the lower strata of glass, whereas the float 3 and the throttling ridge 13 cause a downward and sideward movement of portions of the upper strata. This tends to give a forwarding impulse to the entire cross-section of glass in the channel, and there will be a replacing flow movement toward the draw-pot from practically all substrata of glass in the tank as well as from the surface portions.

As the drift of refined glass proceeds toward the draw-pot along the tapering channel, there will be a constant tendency for all scum or other floating foreign particles to be drawn toward the side walls 10 of the tank because of the generally tapering construction of the channel. This floating material will be further diverted toward the side walls by the front wedge-shaped face of the float 3, already described. These surface impurities may be removed, by the ordinary skimming process, through the openings 18 in the side walls of the furnace chamber.

The cover arches for the tapered refining and cooling portions of the tank are made progressively narrower and lower as the tank narrows from the melting chamber toward the draw-pot. In the construction illustrated, the chamber above that portion of the channel from the melting tank 1 to and somewhat beyond the float 3 consists of a pair of spaced side walls 19 and a second pair of more closely positioned side walls 20, both the wider and narrower portions of this chamber being covered by a continuous cover arch 21. This portion of the tank corresponds to what is known as the refining tank in installations now in use. Beyond the side walls 20 is a third pair of still more closely positioned side walls 22 covered by a lower arch 23. This smaller portion of the chamber encloses that end of the channel which corresponds to the cooling tank in previous constructions. The rear end of this cooling chamber, from which the glass is drawn into the open draw-pot, is substantially closed by any suitable form of blocks or gate members 24. In order to prevent excessive loss of heat from the glass in the open draw-pot, all of this glass except a comparatively narrow portion at either side of the sheet 5 is covered over by a pair of lip-tiles 25, as in previous constructions such as shown for example in the Colburn patent noted above. For the sake of clearness in the drawings, these lip-tiles 25 have been omitted from the plan view shown in Fig. 1.

As shown in Figs. 2 and 3, one or preferably a series of vertically movable hanging partition members 26 are located in the furnace chamber, preferably near the junction of the refining and cooling chambers. These partition members may be formed of suitable refractory material and form a curtain to partly shut off the diminished heating space at the delivery end of the tapering furnace from the larger heating areas toward the melting end of the furnace. These partitions 26 are independently adjustable vertically and will usually be positioned somewhat as shown in Figs. 2 and 3, with the central partition or partitions projecting further down into the chamber than those partitions nearer the sides of the chamber. In this way the central members will impede the passage of heat waves toward the central body of glass in the cooling chamber, and will reflect and radiate this heat back into the refining tank, whereas the more open spaces beneath the partitions 26 adjacent the edges of the tank will permit the free passage of heat, over the side portions 14 of the channel. This heat will raise the temperature of the glass adjacent the walls of the channel, and to a great degree reduce the surface tension which acts as a brake or retarding agent against the free flow of glass along the side channels. Also by properly adjusting the several partition members vertically, more or less heat may be permitted to act on the glass adjacent the draw-pot and thus in a way make this portion of the glass furnace independent of the heat conditions existing in the melting end of the tank. In this way, it will be possible to accurately govern the temperature and fluidity of the glass moving toward the sheet without interfering with the necessary temperature conditions in the melting and refining tanks.

Figure 6:
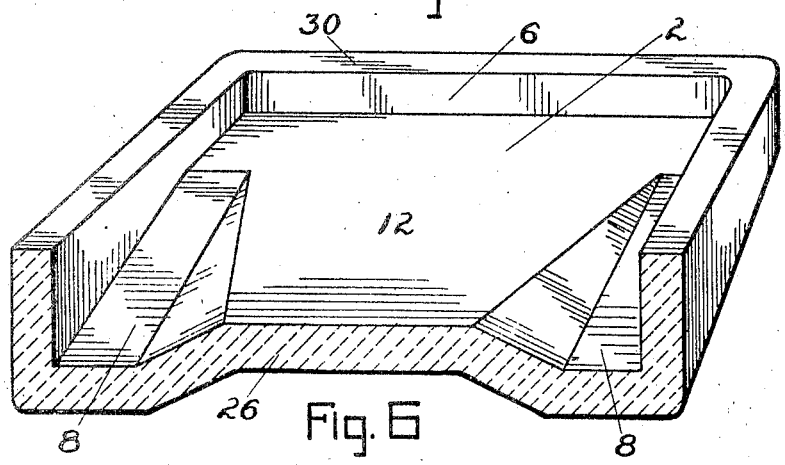
Fig. 6 is a perspective view of the draw-pot, the forward portion of the pot being cut away substantially on the line 6—6 of Fig. 5.
Figure 5:
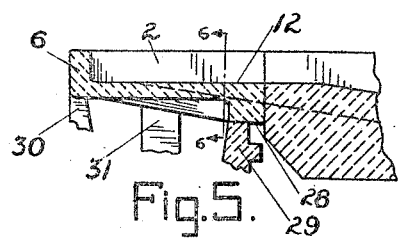
Fig. 5 is a partial vertical central section through the draw-pot and its supports, taken substantially on the line 5—5 of Fig. 1.

It will be noted from Figs. 2, 4, 5 and 6, that the formation of the side channels 8 in the floor of the draw-pot 2 provides a central arched formation in the bottom of the pot, as shown more clearly at 26 in Fig. 6. This will considerably strengthen the pot structure, practically eliminating sagging, and making possible the use of fewer central supports whereby a larger portion of the underside of the pot is left freely exposed to the heating gases in the chamber 27 therebeneath. As shown in Figs. 2 and 5, the bottom rib 28 at the front open end of the draw-pot is supported upon the continuous back wall 29 of the heating chamber 27. The rear closed end 6 of the pot is supported upon a series of arches or stools 30 in the heating chamber, which may be of any approved form and are here illustrated as of the type disclosed in my co-pending application, Serial Number 593,885, filed October 11, 1922. Beneath the side channels 8, at an intermediate point in the length of the pot is a pair of side supporting stools 31, which as shown in Fig. 4, will preferably be cut away centrally at their upper ends as at 32 to leave as much of the pot bottom as possible exposed to the heating gases. The chamber 27 is heated by a series of burners 33, the heating gases passing in through ports 34, around and through the chamber 27 as indicated by the arrows in Fig. 2, and the products of combustion passing out through the flue 35.

It will be apparent that the draw-pot construction hereinbefore described, varies from the common type by providing two deeper slanting side channels formed in the bottom of the pot that communicate with the similar channels at the delivery end of the furnace. The object of this construction is to increase the speed and uniformity of movement of the replacing current along the sides of the pot so as to provide a sufficiency of properly fluent glass at the sources of the sheet edges as well as a free supply of glass to the closed end of the draw-pot beyond the sheet. It should be understood that in the commonly used pot, having a uniformly flat bottom surface, the glass advances with its greatest velocity along the central portion of the pot, and when this central current arrives at the sheet source its upper stratum must flare or fan outwardly toward the edges of the pot to supply the demands of the sheet edges, while its substratum passes under the sheet source to replace the glass drawn from the closed end of the pot. This causes various convolutions and irregular tensional strains in the body of glass adjacent and beneath the sheet source which are believed to affect the uniformity of the sheet itself and sometimes result in a wavy and striated sheet formation. By having these deeper side channels pass to and beyond the sheet source, there will be a more free and even flow of glass to the closed end of the pot, without requiring the substratum movement beneath the main body of the sheet. There will result a more parallel stream line advance of the glass from both ends of the draw-pot into the sheet source and the resulting sheet formation will be more free from locally warping tensional stresses than is the case with the flat-bottomed pot now in use. Also the glass adjacent the sides of the pot will be constantly renewed and will have no chance to stagnate and devitrify.

As a general proposition, constructing a furnace of this type wherein the glass flows from the melting tank through the tapered refining and cooling portions to the pot, will mean a general decrease in furnace dimensions with a considerable increase in radiation surface relative to the amount of glass contained. This decrease in capacity of the tank is brought about through the elimination of those portions of the present tanks which merely contain practically dead or stagnant glass, so that the effective capacity of the tank is in no way diminished. Since the construction of this tank necessitates a more uniform and even flow of all strata of the glass toward the delivery end, there will result a more speedy consumption in sheet form of all glass produced in the melting end of the furnace, thus largely eliminating the formation of dog-metal or otherwise toughened glass, as far as such defects may be caused by tank conditions. This dog-metal is generally formed when the glass has become low in sodium contents from prolonged heating after it is refined or clarified, and from thereafter being exposed to variable temperature conditions.

Claims:

1. A continuous tank furnace for supplying molten glass to sheet-glass machines, comprising a melting tank, a relatively small and shallow pot from which the sheet is drawn, and a refining and cooling tank connecting the melting tank and pot, the side walls of the refining tank converging progressively from the relatively large delivery opening in the melting tank to the relatively narrow open end of the pot.

2. A continuous tank furnace for supplying molten glass to sheet-glass machines, comprising a melting tank, a relatively small and shallow pot from which the sheet is drawn, and a refining and cooling tank connecting the melting tank and pot, the floor of the refining tank sloping upwardly from the relatively deep delivery opening in the melting tank, to the relatively shallow open end of the pot.

3. A continuous tank furnace for supplying molten glass to sheet-glass machines, comprising a melting tank, a relatively small and shallow pot from which the sheet is drawn, and a refining and cooling tank connecting the melting tank and pot, the floor of the refining tank sloping upwardly from the relatively deep delivery opening in the melting tank, to the relatively shallow open end of the pot, and the side walls of the refining tank converging from the wide delivery opening in the melting tank to the relatively narrow open end of the pot.

4. In a continuous tank furnace for supplying molten glass to sheet-glass machines, including a relatively large and deep melting tank and a relatively small and shallow pot from which the sheet is drawn, a progressively tapering refining and cooling tank through which the molten glass flows to the pot.

5. In a continuous tank furnace for supplying molten glass to sheet-glass machines, including a relatively large and deep melting tank and a relatively small and shallow pot from which the sheet is drawn, a progressively tapering refining and cooling tank through which the molten glass flows to the pot, having an elevated central ridge adjacent its narrow delivery end for retarding the central flow of glass and diverting a portion of the flow along the side walls of the tank.

6. In a continuous tank furnace for supplying molten glass to sheet-glass machines, including a relatively large and deep melting tank and a relatively small and shallow pot from which the sheet is drawn, a progressively tapering refining and cooling tank through which the molten glass flows to the pot, and a floater projecting into the surface glass at an intermediate position in the tapered tank, the central portion of the floater being deeper than the end portions, whereby the central flow will be retarted and diverted along the side walls of the tank.

7. In a continuous tank furnace for supplying molten glass to sheet-glass machines, including a relatively large and deep melting tank and a relatively small and shallow pot from which the sheet is drawn, a progressively tapering refining and cooling tank through which the molten glass flows to the pot, having an elevated central ridge adjacent its narrow delivery end for retarding the central flow of glass, and a floater projecting into the surface glass at an intermediate position in the tapered tank, the central portion of the floater being deeper than the end portions, whereby the central flow will be retarded and diverted along the side walls of the tank.

8. In a continuous tank furnace for supplying molten glass to sheet-glass machines, including a relatively large and deep melting tank and a relatively small and shallow pot from which the sheet is drawn, a progressively tapering refining and cooling tank through which the molten glass flows to the pot, and a floater projecting into the surface glass at an intermediate position in the tapered tank, the central portion of the floater being deeper than the end portions, whereby the central flow will be retarded and diverted along the side walls of the tank, the front face of the floater being wedge-shaped and pointing into the floating glass to divert floating impurities toward the side walls of the tank.

9. In a continuous tank furnace for producing molten glass, comprising a refining tank, a floater positioned in the surface glass in the refining tank, the central portion of the floater projecting deeper into the molten glass than the end portions.

10. In a continuous tank furnace for producing molten glass, comprising a refining tank, a floater positioned in the surface glass in the refining tank, the floater being wider and deeper at its center than at the ends, whereby the molten glass will be retarded at the center and diverted toward the sides of the tank.

11. In a continuous tank furnace for supplying molten glass to a sheet glass drawing machine, a shallow draw-pot from which the sheet is drawn, having a closed end and an open end through which the glass flows in from the source of supply, there being relatively deep channels adjacent the side walls of the pot through which glass flows beyond the sheet source to the closed end of the pot.

12. In a continuous tank furnace for supplying molten glass to a sheet glass drawing machine, a shallow draw-pot from which the sheet is drawn, having a closed end and an open end through which the glass flows in from the source of supply, there being deeper channels adjacent the side walls of the pot sloping upwardly from the open end till they merge with the pot bottom beyond the sheet source, molten glass flowing through these channels to replace that withdrawn from the closed end of the pot.

13. In a continuous tank furnace for supplying molten glass to a sheet glass drawing machine, a shallow draw-pot from which the sheet is drawn, having a closed end and an open end through which the glass flows in from the source of supply, and a tapered refining tank through which the molten glass passes to and through the open end of the pot from the source of supply, there being relatively deep channels adjacent the side walls of the tank and pot through which glass flows beyond the sheet source to the closed end of the pot.

14. In a continuous tank furnace for supplying molten glass to a sheet glass drawing machine, a shallow draw-pot from which the sheet is drawn, having a closed end and an open end through which the glass flows in from the source of supply, and a tapered refining tank through which the molten glass passes to and through the open end of the pot from the source of supply, there being relatively deep channels adjacent the side walls of the tank and pot which slope upwardly till they merge with the pot bottom beyond the sheet source, molten glass flowing through these channels to replace that withdrawn from the closed end of the pot.

15. In a continuous tank furnace for supplying molten glass to a sheet glass drawing machine, a shallow draw-pot from which the sheet is drawn, having a closed end and an open end through which the glass flows in from the source of supply, there being relatively deep channels adjacent the side walls of the pot through which glass flows beyond the sheet source to the closed end of the pot, a heating chamber beneath the pot, and pot supporting members within the chamber beneath the channels, the arched pot bottom between the channels being self-supporting.

16. A continuous tank furnace, comprising a tapering refining and cooling tank, and a series of connecting chambers enclosing the tank, said chambers being progressively smaller from the wider to the narrower end of the tank.

17. A continuous tank furnace, comprising a tapering refining and cooling tank, a series of connecting chambers enclosing the tank, said chambers being progressively smaller from the wider to the narrower end of the tank, and an adjustable hanging curtain in one of the chambers to regulate the flow of heating gases through the chambers.

18. A continuous tank furnace, comprising a tapering refining and cooling tank, a series of connecting chambers enclosing the tank, said chambers being progressively smaller from the wider to the narrower end of the tank, and a hanging curtain in one of the chambers comprising a plurality of independently adjustable sections, to regulate the flow of heating gases through the chambers.

19. In a tank furnace for producing molten glass, comprising a refining tank and an enclosing chamber thereover, a hanging curtain in the chamber comprising a plurality of independently adjustable sections, to regulate the flow of heating gases through the chamber.

20. In the art of making sheet glass, the method which consists in advancing a body of molten glass from the continuous melting tank portions of a furnace towards the draw-pot from which the sheet of glass is drawn, in a manner to progressively and gradually reduce its cross-section.

21. In the art of making sheet glass, the method which consists in advancing a body of molten glass from the continuous melting tank portions of a furnace towards the draw-pot from which the sheet of glass is drawn, in a manner to progressively and gradually reduce its cross-section, while simultaneously acting on the body of glass to increase the stream line movement towards the side areas thereof.

22. In the art of making sheet glass, the method which consists in advancing a body of molten glass from the melting end of a furnace through a horizontally tapering delivery channel into a draw-pot in such a manner as to progressively deflect the greater velocity of flow from the center of the body of glass towards the sides thereof at different intervals during its progression towards the draw-pot.

23. In the art of making sheet glass, the process which consists in continuously providing a body of refined glass in a furnace structure adjacent a draw-pot, in withdrawing a sheet of glass from the pot, and continuously causing all the glass in the furnace structure to move under the influence of sheet-drawing tractive force and the force of gravity with progressively increasing velocity from the melting end of the furnace structure to the point of sheet emergence in the draw-pot, while progressively reducing the volume of heating atmosphere thereover and the temperature of the moving body as its velocity is being increased.

24. In the art of making sheet glass, the method of clarifying and imparting like plasticity to a body of refined glass while withdrawing a sheet of glass therefrom, which consists in advancing a body of refined glass from the melting end of a furnace structure toward the point at which the sheet is drawn, in a manner to gradually reduce its cross-section while progressively increasing its velocity, and while concurrently changing its state of fluidity from a liquid to a plastic consistency as its cross-section is being reduced, and during said procedure directing all differently composed particles of matter carried with said body and floating thereon towards the side limits of the furnace structure out of the main line of advance of the body of glass.

25. The method of advancing a replacing flow of molten glass previous to its entrance into a draw-pot from which a sheet of glass is drawn, which consists in causing a flow movement of molten glass along horizontal stratums in a manner to progressively reduce the cross-section of the flow and its volume while hastening its movement, in progressively lowering the temperature of the glass as its cross-section is being reduced, and in causing floating impurities on the surface thereof to move toward the opposite side areas of the flow.

26. The method of advancing a replacing current of molten glass through a furnace into a draw-pot, in which a sheet of glass is drawn, which consists in starting a slow movement of a relatively large dimensioned body of glass in the direction of the draw-pot at a predetermined distance from the melting zone in the body of glass, in progressively reducing the dimensions of the body while increasing the speed and width of its movement and delivering the same into the draw-pot with an approximately uniform velocity along a front practically as wide as the draw-pot.

27. In sheet glass making, the method of producing and equalizing flow movement from a melting tank to the point of sheet emergence in the draw-pot, which consists, first in causing a larger cross-section of flow confluent and inclusive from predetermined stratums of the body of glass in the tank toward the draw-pot, then in progressively reducing the width and depth of the flow while increasing its speed, and thereafter in causing the advancing velocity toward the sides of the flow to be practically equal to the velocity at the center of the flow as it proceeds into the draw-pot.

28. The method of equalizing the supplying velocity of a replacing stream movement of molten glass from a furnace into a draw-pot and toward a sheet source formation under tractive drawing stress therein, which consists in retarding the velocity of the replacing glass along the main central portion of its stream movement as said glass is approaching the draw-pot, while simultaneously increasing the stream line velocity along the side portions of the said glass directionally toward and beyond the sheet source formation within the draw-pot.

29. The method of advancing molten glass into a draw-pot to supply the base of a drawn sheet formation, which consists in retarding the substratum movement along the center of the replacing current of glass which is going into the pot, while relatively accelerating the substratum movement towards the side portions of the pot.

Signed at Toledo, in the county of Lucas, and State of Ohio, this 28th day of February, 1923.

ENOCH T. FERNGREN.